United States Patent [19]

Reidenbach

[11] 4,411,413
[45] Oct. 25, 1983

[54] APPARATUS FOR SHORING DURING THE MANUFACTURE OF A REEFER CONTAINER

[75] Inventor: Robert B. Reidenbach, Honeybrook, Pa.

[73] Assignee: The Budd Company, Troy, Mich.

[21] Appl. No.: 261,464

[22] Filed: May 7, 1981

Related U.S. Application Data

[63] Continuation-in-part of Ser. No. 209,545, Nov. 24, 1980, Pat. No. 4,370,795.

[51] Int. Cl.³ ............................................... B23Q 3/14
[52] U.S. Cl. ..................................... 269/48.1; 269/50
[58] Field of Search ............ 29/559, 455 R; 269/287, 269/48.1, 49, 50, 52, 111; 264/46.5; 249/63; 425/110, 468, 441; 52/127.1–127.6; 33/194

[56] References Cited

U.S. PATENT DOCUMENTS

| | | | |
|---|---|---|---|
| 2,511,900 | 6/1950 | Bryant | 33/194 |
| 2,867,911 | 1/1959 | Atkinson | 33/194 |
| 3,880,415 | 4/1975 | Fujioka | 269/48.1 |

Primary Examiner—Robert C. Watson
Attorney, Agent, or Firm—Edward M. Farrell; Herman Foster; Thomas I. Davenport

[57] ABSTRACT

A first set of selectively movable platens are disposed at a fixed station to receive a container therein to provide shoring of the external surfaces of the container. A second set of selectively movable platens are disposed to provide shoring of the internal surfaces of the container. Expandible and retractable slat members connect the upper corner portions of the second set of platens so that when these platens expand, the slat members provide internal shoring at the inside corners of the container.

6 Claims, 6 Drawing Figures

APPARATUS FOR SHORING DURING THE MANUFACTURE OF A REEFER CONTAINER

This application is a continuation-in-part of Ser. No. 209,545 filed 11/24/80 now U.S. Pat. No. 4,370,795.

BACKGROUND OF THE INVENTION

So-called "reefer containers" or refrigerated insulated intermodule containers, which may form parts of trailers, are well known. Generally, areas between the inner and outer surfaces of the roof and side walls of the reefer form cavities to receive foaming material which provides the insulation. The foaming material may comprise liquid chemicals which react to form a quasisolid mass of air cells.

During the foaming operation, the inner and outer surfaces of the roof and side walls of the container must be shored. The shoring elements comprise platens or other restraining devices used to prevent bulging of the container surfaces during expansion of the foaming material which is inserted into the cavities under very high pressure.

The shoring elements or platens generally comprise sheets or rigid material such as plywood sheets which cover wide areas to provide pressure or resistance to prevent expansion of the surfaces of the container being contacted. Holes in the reefer unit container are adapted to be connected to discharge tubes of the foam chemical metering head to receive the foaming material under high pressure.

In a copending application entitled "Apparatus and Methods to Provide Shoring During the Manufacture of a Reefer Container", filed Nov. 24, 1980, Ser. No. 209,545, now U.S. Pat. No. 4,370,795 issued Feb. 1, 1983, which is assigned to the same assignee as the present invention, there is described a shoring operation in which a trailer or container is put in place at a fixed station in alignment with the external shoring platens. An assembly which includes the internal shoring platens is rolled into the container to align the internal platens with the interior walls and roof of the container. The external and internal platens are then expanded to contact the side walls and roof of the container to provide shoring during a subsequent foaming operation. The overall system described in this application is substantially the same as that described in the copending application.

In the aforementioned patent application, it is noted that when the internal platens expand, the inner ends thereof towards the top corners of the container tend to separate and provide spaces therebetween. This means that the interior top corner portions of the container will not be shored during the foaming operation unless additional means for doing so are provided. The present invention is designed to provide these means for shoring the interior upper corners of the container when the internal platens are expanded.

OBJECTS OF THE INVENTION

It is an object of this invention to provide improved shoring means for reefer containers.

It is a further object of this invention to provide improved shoring means for containers in which substantially entire portions of the walls and roof are shored during manufacture of reefer containers.

BRIEF SUMMARY OF THE INVENTION

A first set of selectively movable shoring members at a fixed station are disposed to receive the container to align first shoring platens and shore the external surfaces of the container. Second shoring platens are then moved into position to shore the interior side walls and roof of the container. Expandable and retractable slat members connect the upper edges of the internal wall platens to the side edges of the roof platens. When the second set of platens expand, the slat members take up the space between the wall and roof platen edges to provide internal shoring of the upper corners inside the containers. The slat members retract within the internal platen areas when the second platens are retracted.

Other objects and advantages of the present invention will be apparent and suggest themselves to those skilled in the art, from a reading of the following specification and claims, taken in conjunction with the accompanying drawings.

DETAILED DESCRIPTION OF THE INVENTION

In describing the present invention, the operations relating to the shoring of a container will be described. Various operations taken prior to and after the shoring operation will not be illustrated or described in detail.

In general, however, a container to be foamed is generally preheated. Following the preheating, masking tape is applied to protect the side panel sheets from the foam. The sides are generally covered with wide plastic sheets. Various front and rear side sheet foam holes and breath holes are drilled as required. Following the preliminary operations in the present invention, the container is driven to a station including the outer shoring apparatus or transported to the station by a bridge crane.

Following the foaming operation after the internal and external shoring is removed, the container is driven from the foaming station or removed from the station by the bridge crane. Plastic sheets and masking tape are then removed and the exterior of the container is cleaned of excess foam.

Figure 1:
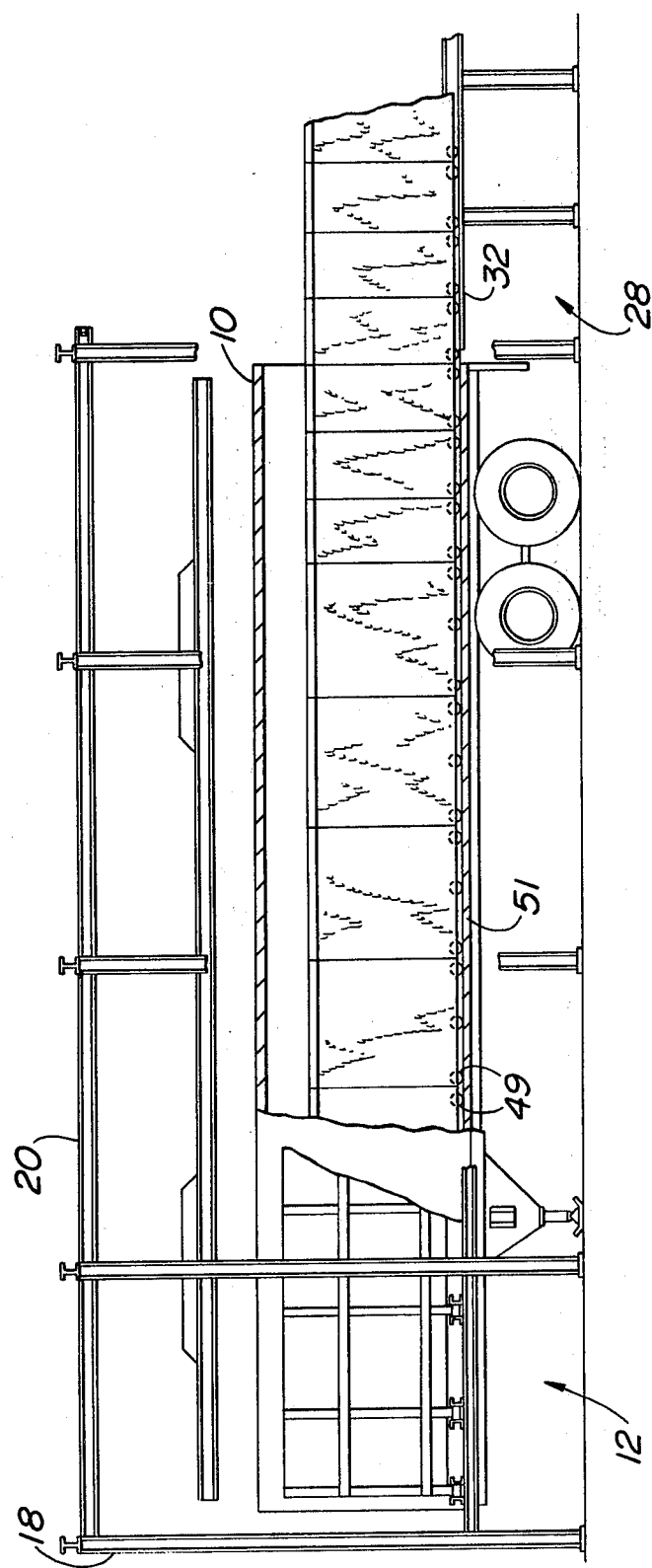
FIG. 1 is a side view of a shoring station, with a trailer container in place, in accordance with the present invention.
Figure 2:
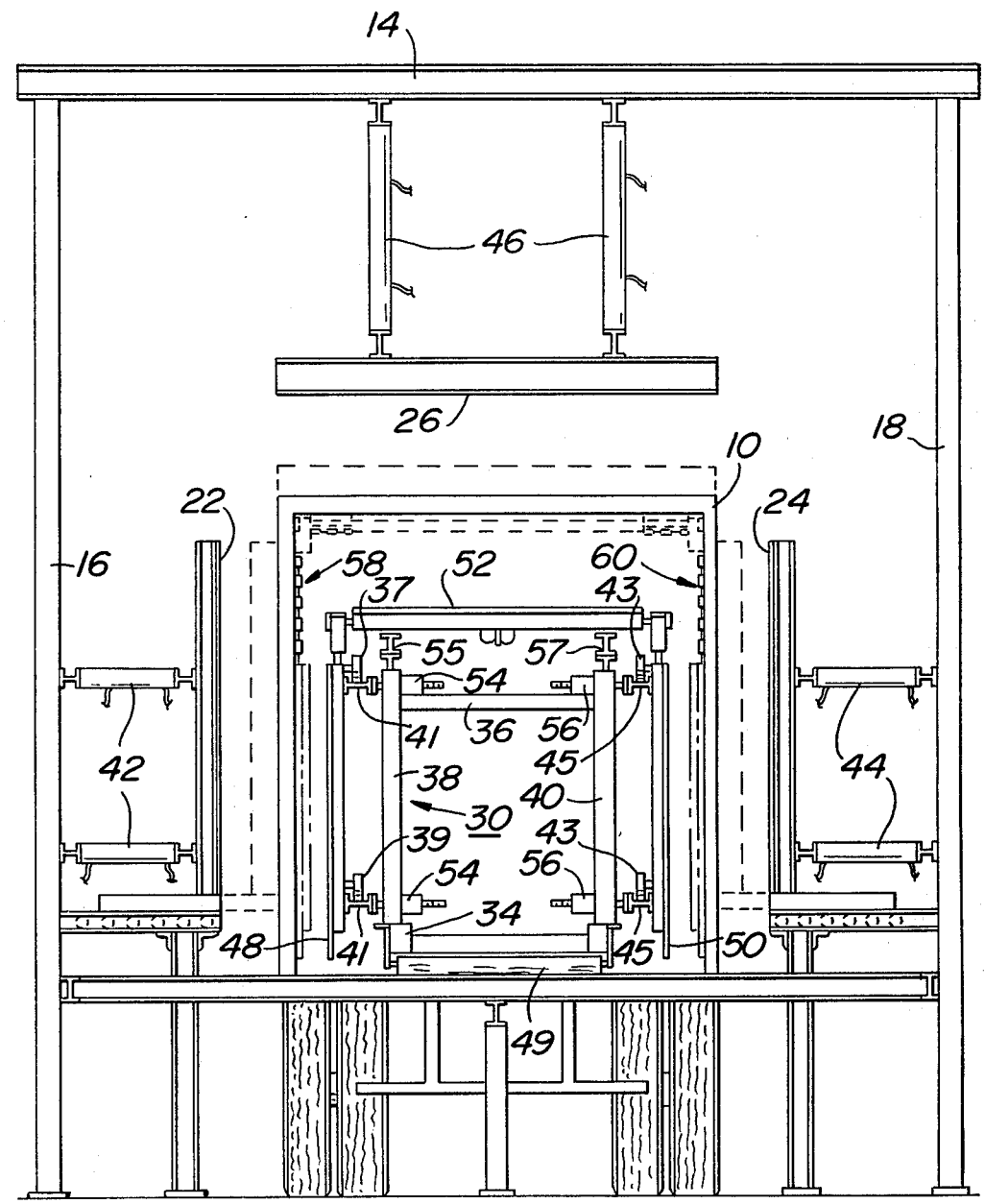
FIG. 2 is an end view illustrating a shoring system with the internal and external shoring platens in expanded and retracted positions, in accordance with the present invention.

Referring particularly to FIGS. 1 and 2, a container 10 of a trailer to be foamed is driven or otherwise transferred to a fixed station 12 which is designed to provide the shoring for the external surfaces of the container 10. The trailer may be moved into position by a tractor, not illustrated. The fixed station comprises an open rectangular frame assembly having a plurality of spaced top structural beams 14, spaced vertical side beams 16 and 18 and top longitudinal beams, such as beam 20.

A plurality of sets of selectively movable shoring members or platens 22, 24 and 26 are suitably attached to the top beams 14 and side beams 16 and 18. The platens comprise sheets of solid material which cover wide areas and are used to provide pressure or resistance to prevent expansion on the surfaces which they contact.

A rear station 28 is employed to receive an open rectangular frame or mandrel 30 which is adapted to be selectively rolled off or on a fixed platform 32. The mandrel or frame 30 is moved into the container 10 during a shoring operation and rests on the platform 32 between shoring operations. This operation is described in the aforementioned copending patent application.

The frame or mandrel 30 comprises longitudinal beams 34, spaced top beams 36 and side beams 38 and 40 connected to suitable reinforcement members.

After the container 10 is in place, the external side platens 22 and 26 and roof platens 24 are moved against the external surfaces of the container 10 by hydraulically driven mechanical screw jack mechanisms 42, 44 and 46, respectively. Various switches, which may be tape switches or microswitches (not illustrated), may be employed to limit the expansions of the various platens 22, 24 and 26 against the external surfaces of the container 10. When the switches are operated, the means which drive the various screw jacks are made inoperative.

Figure 3:
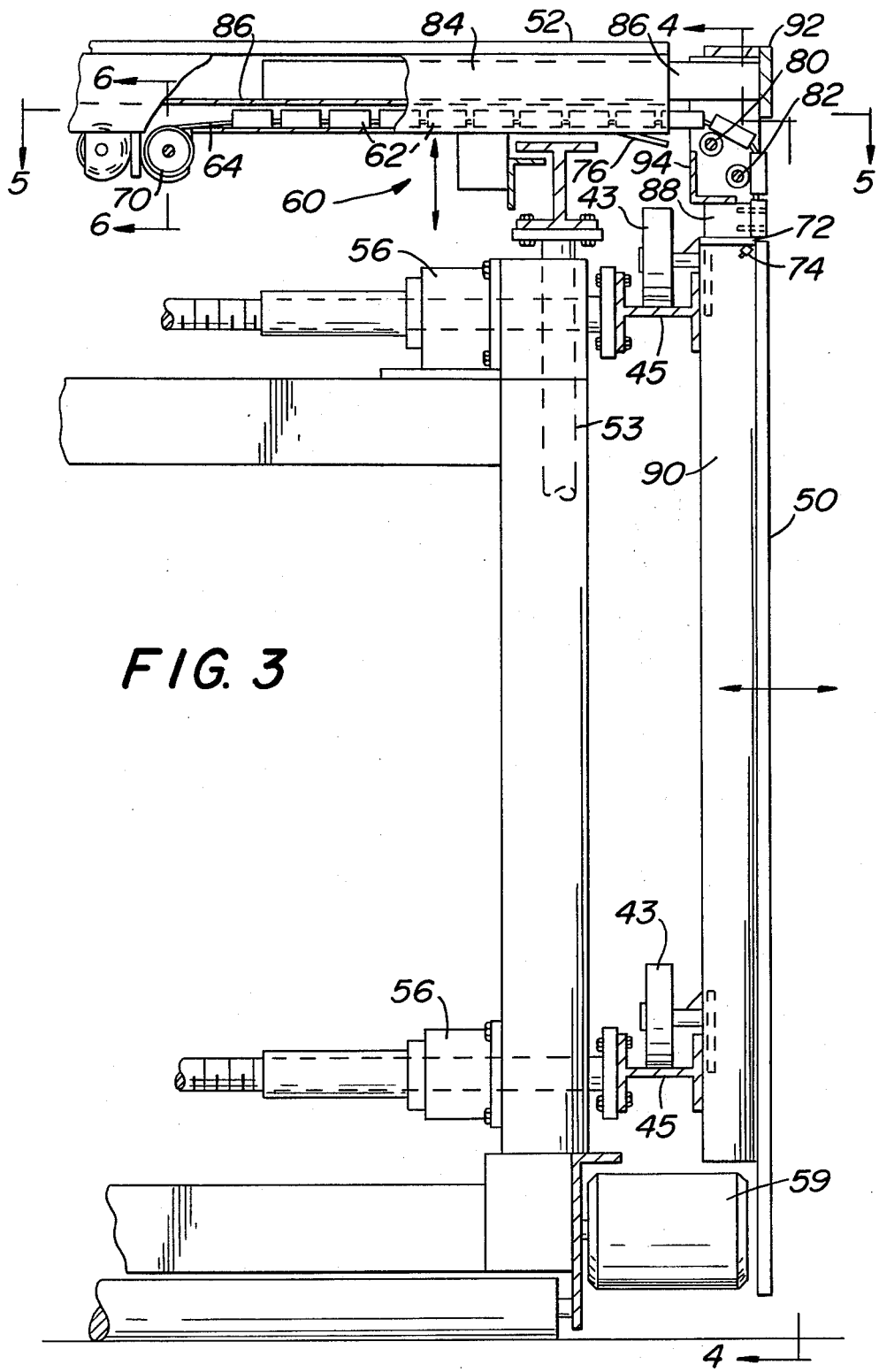
FIG. 3 is a partial enlarged view, with some of the parts broken away, of the shoring system illustrated in FIG. 2.

When the container 10 is in position with the external platens 22, 24 and 26 expanded against the exterior side walls and roof surfaces of the container 10 in a conventional member by conventional means, as described in the aforementioned application, the mandrel 30 is adapted to be selectively rolled into the opening of the container 10. A plurality of spaced rollers 49 are connected to ride in journals in the side rails 34 connected to permit the mandrel 30 to be rolled on the floor 51 of the container 10 when motor means 59 is actuated (FIG. 3).

A plurality of sets of selectively movable platens 48, 50 and 52 are suitably secured to the open frame assembly which comprise the mandrel 30. Means are provided for expanding the platens 48, 50 and 52 outwardly against the interior surfaces of the container 10 after the mandrel 30 has been moved within the opening of the container. The platen 48 is supported by rollers 39 on beams 41 and the platen 50 is supported by rollers 43 on beams 45. This arrangement also provides means for adding to or subtracting from the total lengths of the platens used.

The system described thus far is basically the same as that illustrated and described in greater detail in the aforementioned patent. The internal platens 48, 50 and 52 are extended or driven to the outer position by means of pairs of screw jacks 54 and 56. The screw jacks 54 and 56 are operated by an electric motor or by hydraulic means. The inner platens are expanded until they are in physical contact with the interior walls and roof of the container 10. The upper platen 52 is driven by a pair of screw jacks, such as screw jack 53 (FIG. 3) connected to "I" beams 55 and 57.

It is noted that when the inner side platens 48 and 50 expand horizontally sideways and the upper platen 52 expands vertically upwardly, that the space between the ends of the platens in the area at the upper corners of the container 10 increases. In the present invention, slat assemblies 58 and 60 are connected between the upper ends of the side platens 48 and 50 and the side ends of the top platen 52 so as to occupy the space between the ends of the platens as they are expanded. If these slat assemblies or other shoring means in the space between the platens are not present, it would mean that the upper corners of the container 10 would not be shored and this condition would result in damage to the interior walls of the container during a foaming operation when foam pressures are applied thereto. The slat assemblies 58 and 60 provide a strong shoring means inside at the upper inside corners of the container. Consequently, the entire interior and exterior surfaces of the container 10 including the walls and roof is shored prior to the foaming operation. It is towards the additional shoring means at the inner corners of the container 10 including the slat assemblies 58 and 60 that the present invention is particularly directed. The sizes of the external platens 22, 24 and 26 are more accessible than the interior platens and may be easily made of the proper sizes to provide sufficient outside shoring.

Figure 4:
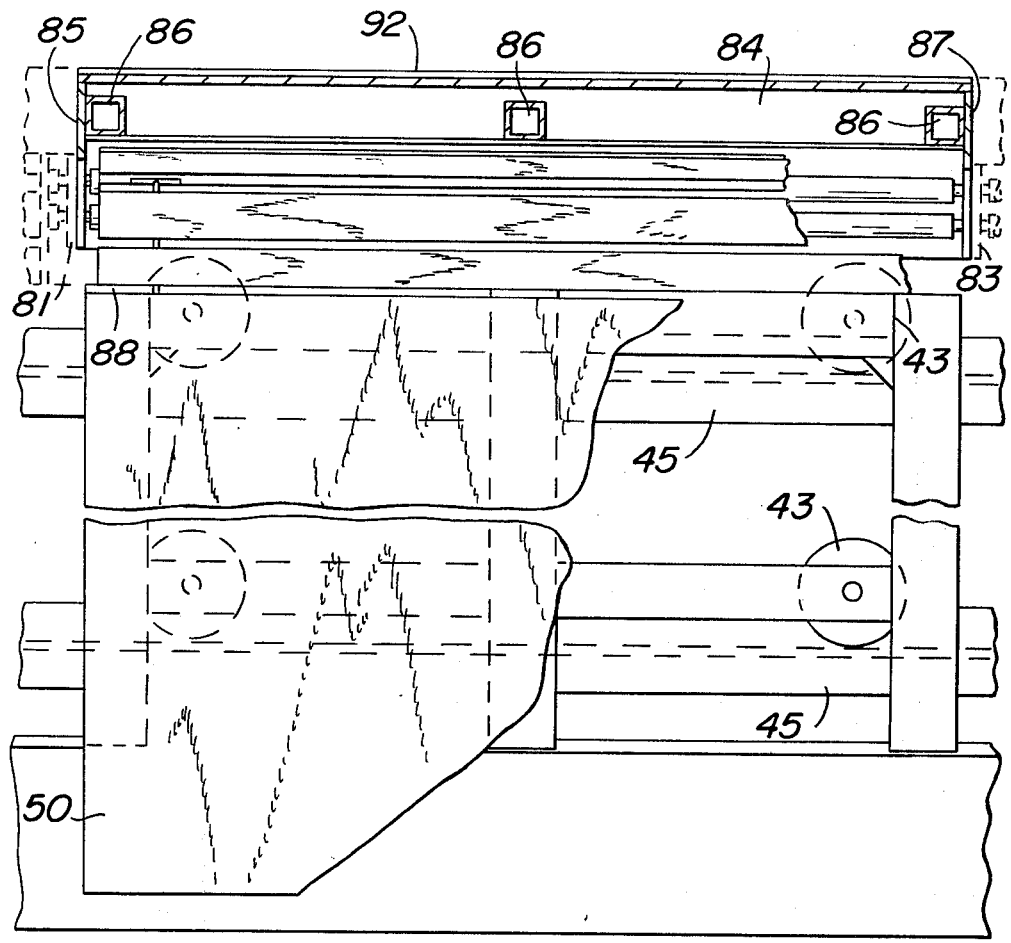
FIG. 4 is a cross-sectional view taken along lines 4—4 of FIG. 3.
Figure 5:
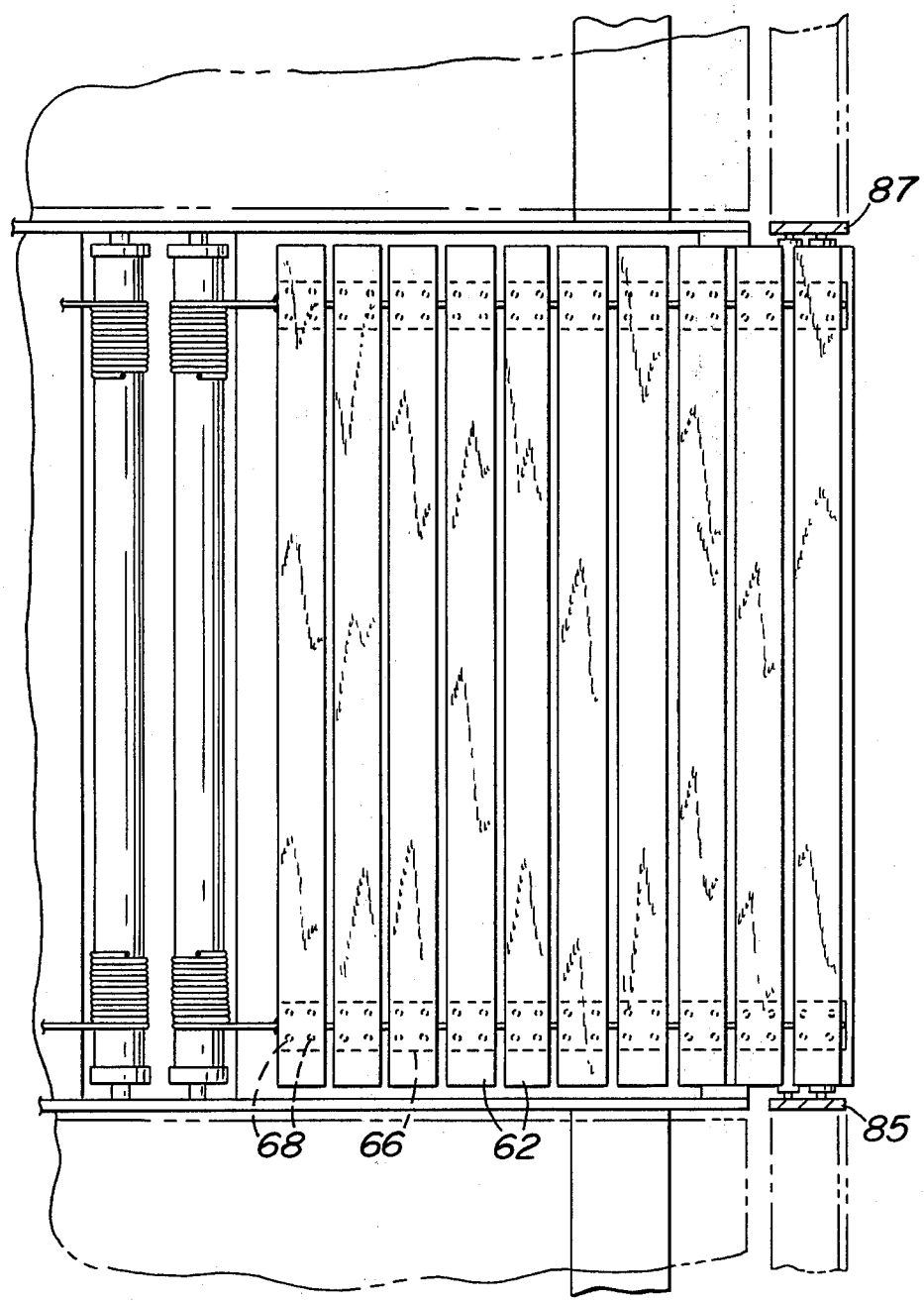
FIG. 5 is a cross-sectional view taken along lines 5—5 of FIG. 3.

Referring to FIGS. 3 through 6, the details of the slat assemblies 58 and 60 are illustrated. Only the slat assembly 60 is illustrated and described in detail, it being understood that the slat assembly 58 located on the opposite side of the container 10 operates in substantially the same manner. FIG. 3 illustrates the platens 50 and 52 in a retracted or inner position. The expanded positions of platens 50 and 52 are illustrated in FIG. 2. Individual slats 62 of the slat assembly 60 are secured together by a cord 64 passing therethrough. As illustrated in FIG. 5, the slat members include a groove therein to receive the cord 64. The cord 64 is held within the grooves by plates 66 secured to the slats by screws 68. One end of the cord 64 is connected to and rolls on a roller 70.

Figure 6:
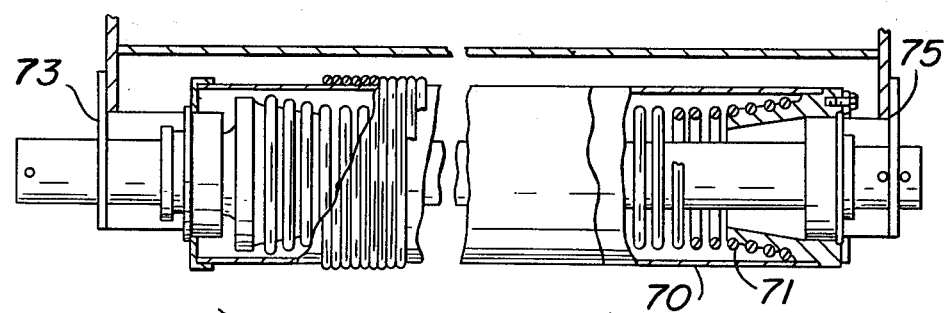
FIG. 6 is a cross-sectional view taken along lines 6—6 of FIG. 3.

One end of the cord 64 is connected to and adapted to wind on a roller 70. As illustrated in FIG. 6, the roller 70 is held in tension by a bias spring 71 connected to end plates 73 and 75 and is held in tension by spring 71 to maintain tension on the cord 64 as it rolls on and off the roller 70.

The opposite end of the cord, after passing through the slat members 64 is passed through an opening in a plate 72 secured to the assembly for the platen 50 and held by a fastener 74.

When the side platens 50 and 52 are in retracted positions, the slat members 62 are held by an angle guide plate 76. Rollers 80 and 82 are secured to be rolled in fixed end structures 85 and 87 (FIG. 4). Rubber bumpers 81 and 83 may be provided. The end structures 85 and 87, along with the rollers 80 and 82, are connected to move vertically and horizontally in accordance with the movements of the platens 50 and 52. These end structures with the rollers are connected to slidable tubes or beams adapted to slide in and out of tubular members connected to the platens 50 and 52. The rollers 80 and 82 therefore maintain positions in alignment with both platens 50 and 52 while the platens 50 and 52 are expanded or contracted.

The tube beam 84 is connected to angle member 92 and disposed to slide horizontally within beams 86 which are secured to the roof platen 52. Likewise, slide beams 88 are disposed to slide vertically within beams 90 which are connected to the side platen 50. The beams or slidable tubular members 84 and 88 are both fixed to structures 92 and 94, which may be part of a single beam member. The structures 92 and 94 hold the end structures 85 and 87. The rollers 80 and 82, in turn, are connected to the end structures 85 and 87. Consequently the rollers 80, 82, the structures 92 and 94 (which comprise a single beam) and the slidable members 84 and 88 all move as a unit in accordance with the horizontal or vertical movements of the platens 50 and 52.

When the platens 50 and 52 are expanded, the slat members 62 of the assembly 60 are slide over the guide plate 76 and the cord 64 is rolled off the roller 70 against the tension provided by the spring 71 within the roller 70. The slat members 62 are moved around the rollers 80 and 82, as either one or both of the platens 50 and 52 are expanded, so as to maintain the expanded slats towards the upper corner of the container 10. The slat assembly 60 maintains a substantially rectangular position as the platens 50 and 52 are expanded or contracted.

The movements of the slat assemblies in accordance with the movements of the side and roof platens, in effect provides means for extending the areas of shoring just as if the sizes of the platens were increased. The arrangement is adapted to provide shoring for different areas inside a container without changing the platens.

Basically the slat members are connected by a cord with one end fixed to the structure associated and fixed with respect to the roof platen and the other end of the cord fixed to the structure fixed to the side platen.

What is claimed is:

1. Apparatus for shoring the interior side walls and interior roof surface of a container, comprising:
    (a) a pair of vertically disposed side platens;
    (b) a horizontally disposed roof platen;
    (c) means for selectively expanding or contracting said pair of side platens in horizontal directions to engage or disengage said interior side walls;
    (d) means for selectively expanding or contracting said roof platen in a vertical direction to engage or disengage said interior roof surface;
    (e) means connecting top edges of said side platens to the side edges of said roof platen to provide shoring of the interior top areas of said interior sidewalls of said container when said side platens and said roof platen are expanded;
    (f) said means for connecting comprise means connected to move horizontally and vertically with said side platens and said roof platen in accordance with movements thereof and expandible shoring means connected to the top edges of said side platens to be guided by said means connected to move horizontally and vertically, and
    (g) said expandible shoring means including a plurality of slat members secured to each other.

2. Apparatus as set forth in claim 1 wherein said means connected to move horizontally and vertically include means for holding one or more rollers secured thereto to engage and guide said slot members as they are moved.

3. Apparatus as set forth in claim 2 wherein said means for holding is connected to slidable elements secured to slide in platen members fixed to said side platens and said roof platens.

4. Apparatus as set forth in claim 3 wherein said slat members are held together by cords connected to spring biased rollers connected to bias said slat members during expansion and contraction of said side and roof platens.

5. Apparatus as set forth in claim 4 wherein ends of said cords are fixed to structures connected to said roof platen and the other ends of said cords are connected to structures connected to said side platens.

6. Apparatus as set forth in claim 5 wherein said spring biased rollers are mounted to end plates secured to structures connected to said roof platen.

* * * * *